United States Patent [19]

Kuly et al.

[11] Patent Number: 5,570,957
[45] Date of Patent: Nov. 5, 1996

[54] BUSHING ARRANGEMENT FOR CARRIAGE ON EXERCISE EQUIPMENT

[75] Inventors: Stephen Kuly, Warrenville; Earl Shraiberg, Chicago, both of Ill.

[73] Assignee: Body-Solid, Inc., Lombard, Ill.

[21] Appl. No.: 265,150

[22] Filed: Jun. 24, 1994

[51] Int. Cl.⁶ ........................................... F16C 29/02
[52] U.S. Cl. ................................. 384/42; 384/908
[58] Field of Search ........................... 384/42, 33, 34, 384/35, 908

[56] References Cited

U.S. PATENT DOCUMENTS 3,537,762  11/1970  Lödige ............................. 384/42
4,564,194  1/1986  Dawson .
4,808,015  2/1989  Babcock ........................... 384/42

OTHER PUBLICATIONS

Ironmaster Catalogue and Price List, selected pp. 1–4, 9 and miscellaneous pages, Apr. 1, 1993.

*Primary Examiner*—Lenard A. Footland
*Attorney, Agent, or Firm*—Hill, Steadman & Simpson

[57] ABSTRACT

A polymer bushing for a carriage in weight lifting exercise apparatus, the carriage being carried on a rail and configured for relative movement on the rail, the bushing providing a snug fit between the carriage and the rail while having an inner bearing that rides on the rail.

7 Claims, 3 Drawing Sheets

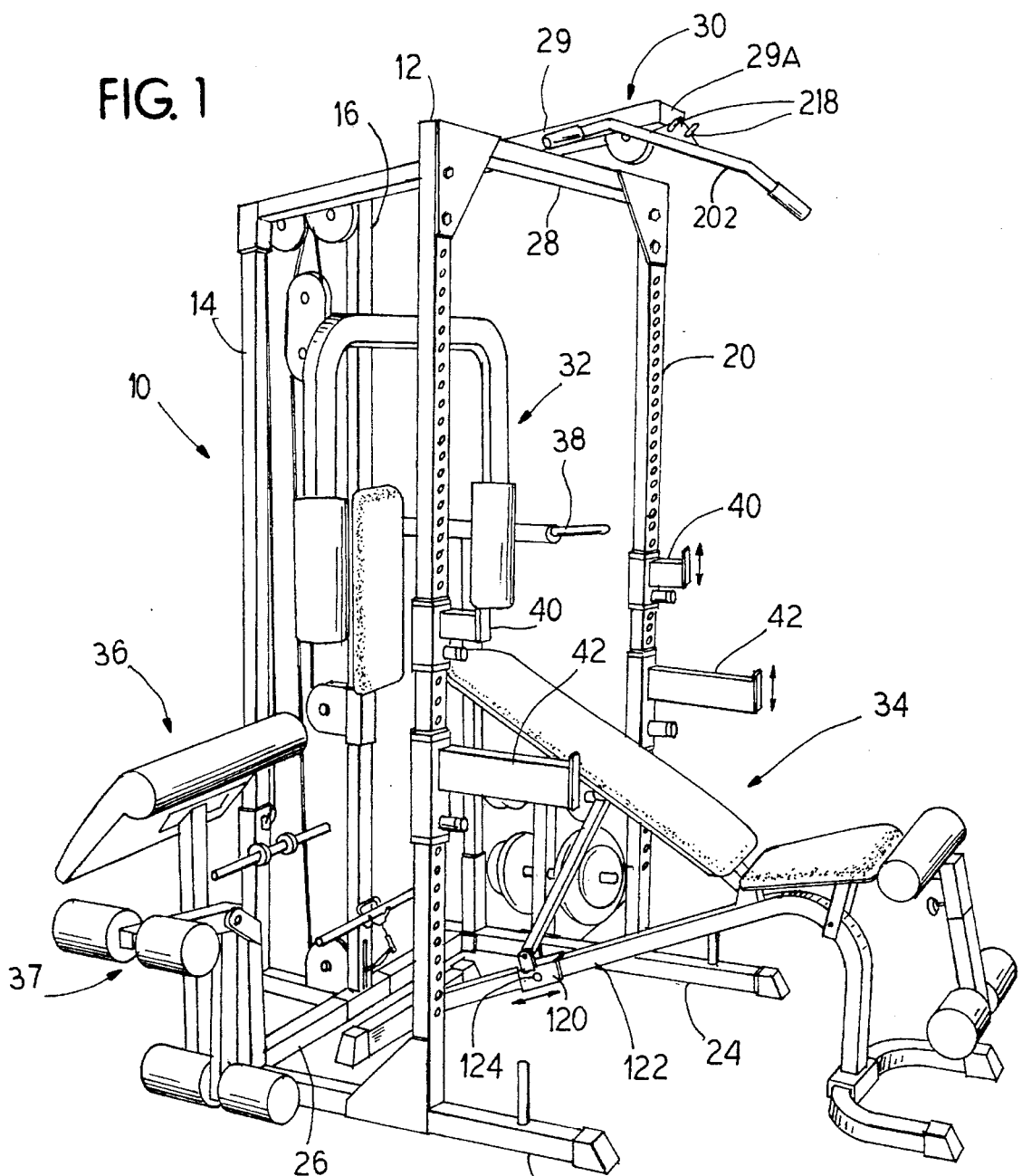

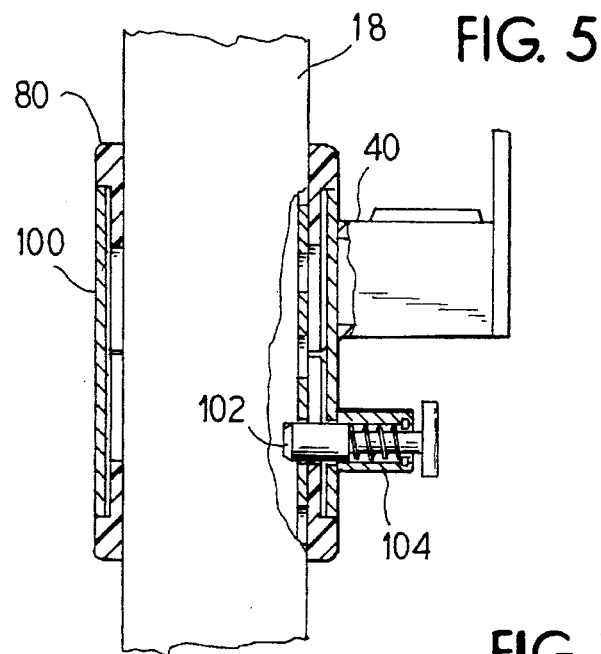
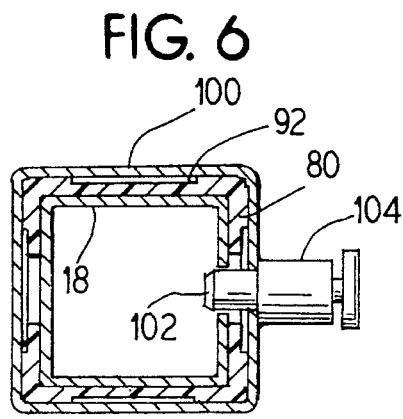
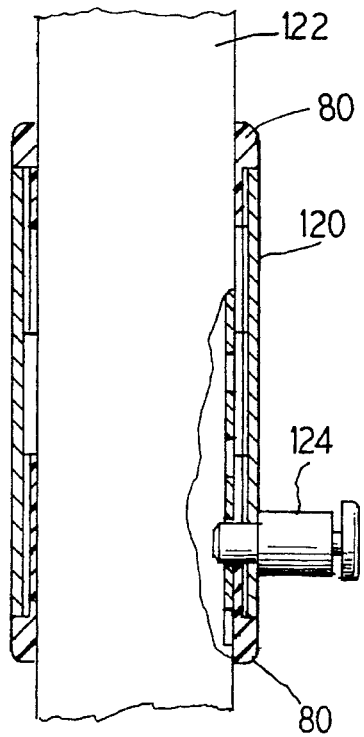
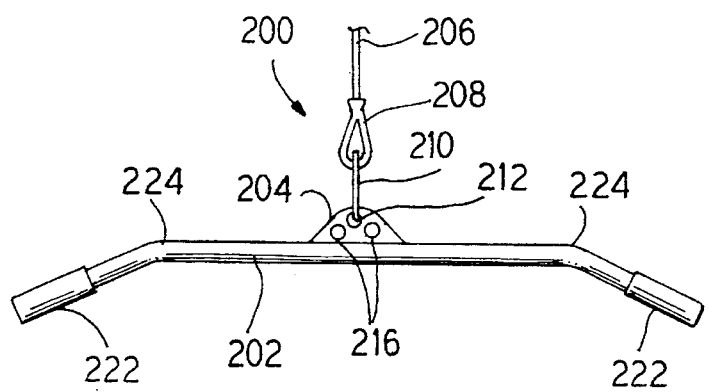
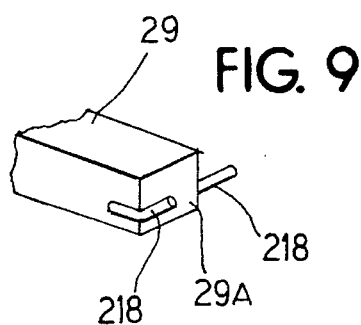

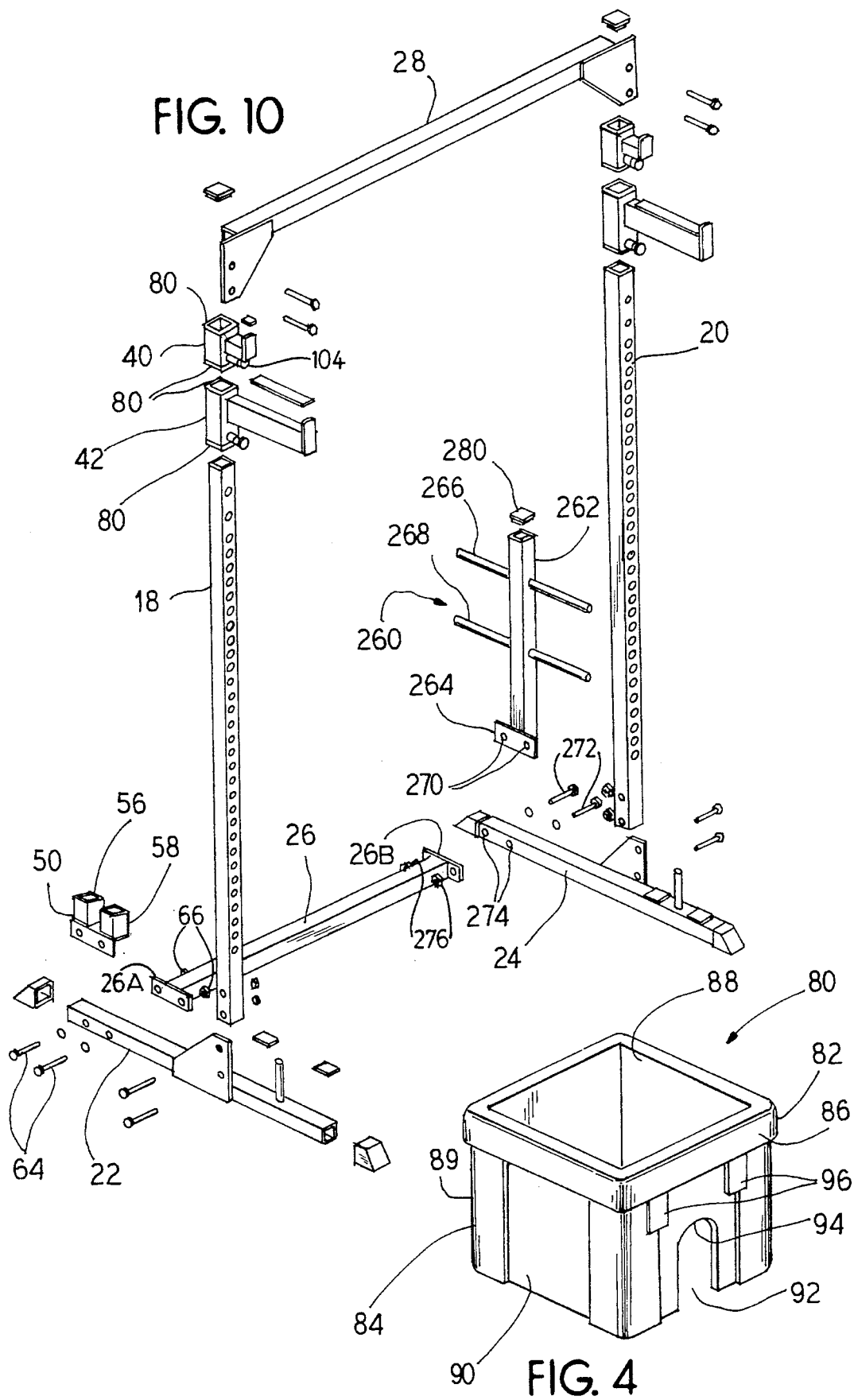

5,570,957

BUSHING ARRANGEMENT FOR CARRIAGE ON EXERCISE EQUIPMENT

BACKGROUND OF THE INVENTION

The present invention generally relates to weight lifting exercise equipment. More specifically, the invention relates to multi-station weight lifting exercise equipment wherein one or more exercise-specific units are incorporated into a gymnasium unit.

In U.S. Pat. No. 4,564,194, it is stated that:

Exercise equipment generally falls within one of two main categories. A first category of exercise equipment is primarily concerned with improving the cardiovascular system by encouraging a user to make rapid, repetitive, unrestricted movements for extended periods of time. This raises the pulse rate, causes capillary expansion, and induces deep breathing, but does not usually build muscle mass.

Exercise equipment of the second category is more concerned with improving muscle tone and increasing muscle mass. This type of equipment usually requires a user to exert force against a resistance pressure provided by a weight or a spring. Of course, there is some degree of overlap between these two categories since equipment designed to increase cardiovascular fitness may also increase muscle mass, and equipment designed to increase muscle mass may also improve cardiovascular fitness. However, the primary benefit of the equipment is usually fairly well defined by which category it falls into.

Weight training belongs to the second category of exercise equipment in that it is designed primarily to increase muscle mass and to improve muscle tone. While there are many types of weight lifting apparatus, the most common are free weight units and weight lifting stations. Free weights, which are also known as barbells, usually include a long, steel bar provided with a number of disk shaped weights, and collars for holding the weights on the bar. Free weights are often used with a weight lifting bench.

Exercise equipment sales have been robust in recent years. This generally follows a trend toward concern about health and well-being. While the market for exercise equipment is diverse and segmented, one area of particular interest concerns that of multi-station weight lifting apparatus wherein a plurality of muscle group specific weight lifting exercise units or stations are combined into an overall apparatus, such as a gymnasium. Each exercise station then, as that term is used herein, comprises an operative assembly of a source of weight lifting resistance or opposition (free weights or a bias source) and related supports and user interactive parts so that at least one muscle group can be exercised. Such gymnasiums permit a user to undertake a more complete workout by exercising more and different muscles, while the gymnasium used is relatively compact.

Multi-station weight lifting exercise equipment are marketed by Body Solid, Inc., under the following designations: "PRO SMITH GYM", "PRO SMITH MACHINE", "MUSCLE CRAFT GYM", "MULTI-PRESS RACK" and "POWER-FLEX GYM," among others. This equipment is more fully described in a sales brochure produced by Body Solid, Inc. and bearing copyright 1993, the contents and disclosures of which are fully incorporated herein by reference. A copy of such catalog accompanies the present application.

The PRO SMITH GYM and MUSCLECRAFT GYM apparatus are designed for a full range of pressing exercises, squats, calf raises, upright rows among others. Specifically, there is included a so-called lat station, lat referring for latissimus dorsi; an incline/decline bench for pressing exercises and abdominal muscle exercises; a pectoral and posterior deltoid development station; a knee and thigh muscle station; a leg curl station; a biceps station; and a so-called dip station for exercising the pectorals, anterior deltoids and triceps.

The POWER FLEX exercise equipment is similar in ultimate function although the specific constructions of these machines may differ. Most notably, these machines are designed to be modular in construction so that various exercise stations can be added in various combinations to suit the needs of an individual consumer.

SUMMARY OF THE INVENTION

The present application provides one or more inventions that are improvements on multi-station weight lifting exercise equipment such as those identified above.

In one aspect, the present application provides plastic bushings on carriage parts to provide a tighter fit between the carriage parts and the rails on which they ride while permitting easy relative sliding movement therebetween.

In another aspect, the application provides a latissimus dorsi station in which a handle bar is configured to alternatively be attached to an overhang rail to thereby provide a secured chin-up bar in addition to the latissimus dorsi workout function.

In another aspect, the application provides a multi-station weight lifting exercise gymnasium with a weight tree secured on a framing member of the gymnasium.

In yet another aspect, the application provides a multi-station weight lifting exercise gymnasium having secured on a framing member thereof a support bracket that supports one or more exercise stations.

In an embodiment of one invention, there is provided exercise equipment with a carriage unit moveable relative to a longitudinal member or rail. In the carriage unit there is provided at least one plastic bushings between the carriage unit and the longitudinal member, the bushings smoothing travel of the carriage unit along the longitudinal member as well as snugging the fit therebetween. Such carriage units generally are provided on adjustable portions of exercise units.

In an embodiment of another invention, there is provided a weight tree attached to a frame member of a multi-station weight lifting gymnasium.

In an embodiment of another invention, there is provided a handle bar constructed to be used alternatively as a latissimus dorsi exercise handle bar or a chin-up bar. To that end, the bar is secured to an overhang rail for use as a chin-up bar, i.e., capable of securely supporting the weight of an exerciser performing chin-ups.

In an embodiment of another invention, there is provided a multi-station weight lifting gymnasium having a support bracket attached along a lower frame member, the support bracket constructed to receive and support one or more exercise stations.

These and other features of the inventions disclosed herein are discussed in greater detail below in the following detailed description of the presently preferred embodiments with reference to the accompanying drawings.

BRIEF DESCRIPTION OF THE DRAWINGS

FIG. 1 illustrates a perspective view of a multi-station weight lifting exercise apparatus or gymnasium incorporating inventions disclosed herein.

FIG. 2 illustrates a partial perspective view of a support bracket for organizing and supporting one or more weight lifting exercise stations on the gymnasium of FIG. 1.

FIG. 3 illustrates a cross sectional view of the support bracket of FIG. 2 taken generally along the line III—III.

FIG. 4 illustrates a perspective view of a bushing useful for carriages used in the gymnasium of FIG. 1.

FIG. 5 illustrates a cross sectional view of a first carriage positioned on a rail with a bushing of FIG. 4 therebetween.

FIG. 6 illustrates a cross sectional view of the first carriage and rail arrangement of FIG. 5 taken generally along the line VI—VI.

FIG. 7 illustrates a cross sectional view of a second carriage positioned on a rail with a bushing of FIG. 4 positioned therebetween.

FIG. 8 illustrates a latissimus dorsi exercise bar which also can serve as a chin-up bar.

FIG. 9 illustrates a perspective view of an end portion of an overhead rail of a latissimus dorsi exercise station which is configured also to accept securely thereon the latissimus dorsi exercise bar so that chin-ups can be performed.

FIG. 10 illustrates an unexploded perspective view of a portion of a frame for the gymnasium of FIG. 1 as well as the support of FIGS. 2 and 3 and a weight tree.

DETAILED DESCRIPTION OF THE PRESENTLY PREFERRED EMBODIMENTS

As mentioned above, several inventions are described herein. These inventions will be discussed in turn, although no significance is to be attached to the order in which they are discussed.

In FIG. 1 there is illustrated a multi-station weight lifting gymnasium 10 in which the various inventions described herein can be employed. As illustrated, the gymnasium 10 includes a frame 12 on and from which are supported various exercise stations. Illustrated gymnasium 10 is of the type marketed by Body Solid, Inc., under the designation "MUSCLE CRAFT", although, of course, the inventions are applicable to other exercise apparatus.

The frame 12 comprises a number of vertical rails 14, 16, 18 and 20 and horizontal rails 22, 24, 26, 28 and 29 operatively assembled to sturdily support the various exercise stations of the gymnasium 10. The manner in which such gymnasium 10 is assembled is well known and not of further interest herein, and thus not further described except as may be pertinent to the description of an invention. It should be noted that horizontal rails 22, 24 and 26 extend along a floor and thus can be considered floor rails, with rail 26 being a cross rail secured between rails 22 and 24. Horizontal rail 29 forms what can be referred to as an overhead or overhang rail, the purposes of which will be explained more fully below.

As may be readily perceived by those who regularly use such multi-station exercise gymnasiums as that illustrated in FIG. 1, the exercise stations supported on or from the frame 12 include a latissimus dorsi exercise station 30, a pectoral and posterior deltoid press exercise station 32, a flat/incline/decline bench exercise station 34 (at which bench presses and leg exercises can be performed), a preacher curl exercise station 36 (at which bicep curls can be performed with an angle pad), a leg extension exercise station 37 (at which hamstring and gluteus muscle exercises can be performed), and a dip exercise station 38 (at which dip exercises can be performed). Such types of exercise stations in general are well known and, therefore, further explanation is not provided herein except as is useful in describing the inventions disclosed herein.

In addition to the foregoing, however, there are carried on rails 18 and 20, a pair of short spotter arms 40 and a pair of long spotter arms 42. Spotter arms serve to support barbells thereon and to catch a barbell should it be dropped while in use.

As will be described more fully below, these spotter arms 40 and 42 incorporate therein one of the inventions disclosed herein, namely, the use of plastic bushings preferably in the form of smooth sliding polymer moldings. Preferably, the polymer is a nylon, and most preferably, polyhexamethylene adipamide which is a nylon available under the designation or mark NYLON 6/6. These bushings are provided in carriage or slider portions of the spotter arms 40 and 42, described more fully below.

With reference to FIGS. 1, 2, 3 and 10, a first invention is now discussed. This invention concerns a structure for supporting one or more exercise stations on the frame 12, specifically on a horizontal rail such as the floor rail 22.

As illustrated best in FIGS. 2 and 3, in accordance with one invention, a support bracket 50 for an exercise station includes a plate-shaped attachment member 51 for attaching the support 50 to a horizontal rail, preferably a floor rail. The member 51 is constructed to conform about an outer contour of the floor rail 22, which in the illustrated embodiment is rectangular in shape.

As can be seen, the attachment 51 is an angle iron-shaped member having two plate-shaped sides 52 and 54 bent out of a sheet so as to conform about a longitudinal corner 23 of the rectangular outer contour of the rail 22. Side 54 is positioned to lie on an upper side 22A of the rail 22, while the side 52 is positioned to lie against a side 22B of the rail 22.

Extending vertically upward from the plate side 54 are two support posts 56 and 58. In the illustrated embodiment, these posts 56 and 58 comprise rectangular tubular members which are secured to the plate 54. These posts 56 and 58 are of a height and shape sufficient (e.g., 1¾"×1¾" square, 2-2½" high) to securely receive thereon downwardly extending legs 60 and 62 (e.g., 2"×2" square), respectively, of one or more exercise stations, such as the leg exercise station 37 and preacher curl station 36, or both of these stations. In the illustrated embodiment, exercise station 36 has downwardly extending leg 60 and exercise station 37 has downwardly extending leg 62 so that both are received in support bracket 50. It can be appreciated that in so receiving and supporting the exercise stations 36 and 37, the support bracket 50 holds the exercise stations 36 and 37 in vertical, easy-to-reach positions for a safe, clean and organized workout area.

In FIGS. 2, 3 and 10, it can be seen that the support bracket 50 is secured to the rail 22 by means of two bolts 64 that extend through holes 66 provided in the plate 52 and holes 68 provided in the rail 22. Nuts 70 are then threadingly received on the threaded ends of the bolts 64 to secure the assembly together.

As illustrated in FIG. 10, the cross rail 26 of the frame 12 may include an attachment plate 26A at one end thereof with holes 26B which coincide with the holes 70 in the rail 22 when the plate 26A is abutted against the rail 22 so that the bolts 64 can extend through the plate 22A and thus secure the support bracket 50 and the rail 26 to the rail 22.

Preferably, the support bracket 50 and all components thereof are made of a metal or metal material of sufficient strength to support the one or more exercise stations, for example 11, 12 or 14 gauge steel. However, it is conceivable that other materials could be used, if sufficiently strong. The support posts 56 and 58 preferably are welded on all four sides to the plate side 54 although welding along only two sides would be sufficient.

In FIGS. 4–7 there are illustrated embodiments of another invention.

In FIG. 4 there is illustrated a plastic bushing 80 useful in carriages or sliders in moving parts of an exercise station, carriages being those units which are moveable along a rail, for example, for adjustment purposes or guiding purposes as well as for safety reasons.

As illustrated, the bushing 80 is a tubular member having an enlarged end portion 82 and a relatively thin walled portion 84. The outer surface 86 of the enlarged end portion 84 preferably is textured, for example, by molding. An inner surface 88 of the bushing 80 is glassy smooth, i.e., extremely smooth, to provide a bearing surface, the purposes of which will become apparent. The bushing 80 preferably is made out of a polymer material, preferably polyhexamethylene adipamide.

Further to the description of the bushing 80, the relatively thin walled portion 84 includes an outer wall 89 in which are formed channels 90, each channel 90 extending along a longitudinal axis of the bushing 80, and comprising a shallow rabbet. In the preferred embodiment illustrated in FIG. 4, the bushing 80 is rectangular tubular in shape and thus has four longitudinal sides. As further illustrated in FIG. 4, each longitudinal side includes a channel 90 as described above and as shown in the figure.

In addition, however, at least on two opposite sides of the bushing 80, there are provided in the thin walled portions 84, and more specifically within the channel 90 thereof, notches 92 formed to accommodate a locking bolt therethrough. To that end, the notches 92 extend from the longitudinal end of the thin walled portion 84 to a point along the respective channel 90 where they terminate in an arcuate shape 94. This arcuate shape accommodates a circular shaped bolt.

Finally, the bushings include on each side of the thin walled portion 84 which includes a notch 92, a pair of bosses 96 that extend from a position just outside of the channel or rabbet 90 to a position within the channel 90. These bosses 96 serve to enhance a tight fit between a bushing 80 and a carriage as described herein.

As illustrated best in FIG. 5, the bushing 80 is designed to be positioned between a carriage 100, for example, of a short stopper arm 40, and a rail on which the carriage rides, in this case the rail 18 along which the stopper arm 40 rides. As described above, the stopper arms 40 are adjustable along their respective rails. As can be seen, the carriage 100 essentially comprises a short rectangular tube received on and about the rail 18.

The interior glassy smooth surface 88 of the bushing 80 is designed to glide smoothly on the respective rail. In contrast, the outer surface 88 of the bushing 80 is designed to be secured to the carriage 100 of the stopper arm 40. For that purpose, the outer wall 89 is allowed to remain rough, and then preferably is secured to the carriage by means of, for example, a suitable glue. Further, the thickness of the walls 84 of the bushing 80 are selected such that a sufficiently tight or snug fit is provided between the carriage and the rail, this preventing wobbling of the carriage as it travels along the rail. The channels 90, however, provide a channel within which glue can be placed to secure the bushing 80 to the carriage, without adversely affecting the snug fit of the bushing.

As also illustrated in FIG. 5, it can be appreciated that two bushings 80 are provided for every carriage in the embodiment disclosed herein. Each bushing 80 is placed on opposite ends of a given carriage to maintain the carriage in a stable relationship with respect to the rail along which it rides. In FIG. 5, two bushings 80 are provided at opposite ends of the carriage 100. It can also be seen that the enlarged ends 82 protrude from the carriage and thus the textured outer surface 84 provides a pleasing appearance to the bushing portion that can be seen by a user of the gymnasium 10.

As can also be seen in FIGS. 5 and 6, a locking bolt 102 extends through the notch 92 in a manner described previously. The locking bolt 102 engages suitably formed openings in the rail to lock the carriage in a fixed position along the rail. These features are well known and need not be further discussed herein.

It can be appreciated that such a bushing arrangement provides a vast improvement over the previously used TEFLON coated tape arrangements wherein TEFLON coated tape was used to tighten the fit between carriages and rails while attempting to offer a bearing surface. However tape is more difficult to apply, more readily deteriorates and separates from the carriage, and clearly cannot offer the same snug fit.

Additionally, there are prior art plastic cap units which are positioned at one end of the outer of a pair of telescoping rails, such as are used in bench presses. However, these cap units clearly do not provide the bearing surface or the tight fit between the carriage and rail as described above. Instead, they merely provide a loose fit between the telescoping rails and a decorative protective trim on the end of the outer rail.

In FIG. 7, there is illustrated another carriage 120 associated with the flat/incline/decline bench 34 (see FIG. 1) which rides along a rail 122 and which includes a locking bolt 124. The structure and interaction of the bushing, carriage and rail essentially are the same as described previously. This embodiment is illustrated solely for the purposes of pointing out that alternative embodiments are available for other carriages such as the carriage 120 of the flat/incline/decline bench 34.

In FIGS. 1, 8 and 9 there is illustrated an embodiment of a third invention disclosed in the application. This invention concerns a structure for converting a bar used for exercise of latissimus dorsi muscles into a chin or pull-up bar. With this structure, the bar can be used for two functions.

In that regard, in FIG. 8 there is illustrated a latissimus dorsi exercise bar 200 which includes a rigid handle bar 202, preferably made of steel, with a centrally positioned tab 204 extending therefrom. The handle bar 202 is coupled to a source of weight lifting resistance or opposition (for example, a weight or spring system) by means of a line or cable 206 which is attached to the tab 204 by means of a suitable eyelet 208 and connecting link 210. The eyelet 208 is formed or connected to the line 206 and the link 210 connects the eyelet 208 to the tab 204. For that purpose, the tab 204 includes a centrally positioned opening 212 in which is engaged the link 210.

Also included in tab 204 are two further openings 216 suitably sized to engage a pair of hooks 218 secured to one end 29A of the overhead or overhanging horizontal rail 29.

These hooks 218, which serve as a support for the bar 202, are illustrated best in FIGS. 9 and 10. It can be appreciated that the rail 29 forms part of the latissimus dorsi exercise station 30 and thus the cable 206 is supported by a suitable pulley arrangement not further described herein hangs from the end 29A of the rail 29. The weight and pulley system providing the source of resistance is well known and need not be explained.

In completing the description of the handle bar 202, it can be seen that the handle bar includes two grips 222 provided at opposite ends of the handle bar and that the handle bar is bent slightly at corners 224 to provide for more muscle contraction when the latissimus dorsi exercise capabilities of the handle bar are employed.

As illustrated best in FIG. 10, when the handle bar 202 is to be used as a chin-up bar, it is secured and supported on the hooks 218 which in turn are secured to an end of the overhead rail 29 which is part of the latissimus dorsi exercise station 30, as illustrated best in FIG. 1. In this position, a user can use the handle bar 202 as a chin-up bar as it will be securely supported on the rail 29 at a height sufficiently high such that the exerciser can lift himself or herself off of the ground and perform chin-ups. The hooks 218 preferably are of a length and curvature sufficient to prevent the bar 202 from readily disengaging from the hooks 218 during use, while allowing suitable ready disengagement when the bar 202 is disengaged for use in its latissimus dorsi exercise function.

In FIG. 10, there is illustrated an embodiment of a fourth invention. In this fourth invention, a weight tree 260 is provided that can be attached to a horizontal rail, preferably a floor rail of a frame 12 of the gymnasium 10, e.g., the floor rail 24.

As illustrated, the weight tree 260 preferably includes a post 262 that extends in a vertical direction. Extending horizontally from the post 262 are pegs 266 and 268 on which can be supported weights. Normally, weights such as to be secured to barbells and the like include a central opening that is circular in shape, and, accordingly, the posts 266 and 268 preferably comprise circular rods on which these weights can be secured. It can be appreciated, however, that square rods would work equally well.

The vertical post 262 is attached to a floor rail, for example, the floor rail 24, by means of a plate 264. The plate 264 is attached to a lower end of the post 262, for example by welding and the like and extends beyond the rail so that it can be attached to the floor rail 24 by means of bolts 272 which would extend through openings 270 formed in the plate 264 and openings 274 formed in the rail 24. Nuts 276 threadingly received on the bolts 272 serve to complete the attachment of the post 262 to the rail 24.

As was the case with the support 50, the cross rail 26 may include an attachment plate 26B at a longitudinal end thereof, which plate would also include suitable holes 280 through which the bolts 272 can be received so that the attachment plate 26B of the cross rail 26 could be secured to the rail 24 in conjunction with the securing of the vertical post 262 to the rail 24.

For aesthetic purposes, the vertical post 262 preferably includes, if it is a hollow tubular member, a suitable cap 280 at the top end thereof.

It can be appreciated that the weight tree 260 serves to receive weights on its pegs 266 and 268 for storage purposes. Of course, more or less such pegs can be included depending on the number of weights to be stored. Additionally, like the support 50, the weight tree 260 can be made of a heavy gauge of steel, e.g., 11, 12 or 14 gauge steel.

Although modifications and changes may be suggested by those skilled in the art, it is the intention of the inventors to embody within the patent warranted hereon all changes and modifications as reasonably and properly come within the scope of their contribution to the art.

We claim:

1. An exercise apparatus, comprising:

at least one exercise station having at least one rail;

a carriage carried on said rail, the carriage constructed for relative travel along said rail; and at least one polymer bushing snugly fitted between said carriage and said rail, said bushing having a smooth bearing surface which faces and rides directly on said rail without requiring lubricant, wherein said polymer bushing is made of polyhexamethylene adipamide.

2. An exercise apparatus comprising:

at least one exercise station having at least one rail;

a carriage carried on said rail, the carriage constructed for relative travel along said rail; and at least one polymer bushing snugly fitted between said carriage and said rail, said bushing having a smooth bearing surface which faces and rides on said rail, said bushing comprising a substantially rectangular tubular member, said tubular member having an enlarged end with a shoulder which abuts an end of said carriage, said bushing further comprising four sides, each side having a rabbet which extends longitudinally from the shoulder to a longitudinal end of said bushing opposite said shoulder, and notches formed in opposite sides of said bushing in which can be accommodated a locking pin.

3. The exercise apparatus of claim 2, wherein said bushing comprises a rectangular tubular member having an inner surface, the inner surface being said bearing surface.

4. The exercise apparatus of claim 2, wherein said polymer is nylon.

5. The exercise apparatus of claim 4, wherein said nylon is polyhexamethylene adipamide.

6. An exercise apparatus, comprising:

at least one exercise station having at least one rail;

a carriage carried on said rail, the carriage constructed for relative travel along said rail; and at least one polymer bushing snugly fitted between said carriage and said rail, said bushing having a smooth bearing surface which faces and rides on said rail, said bushing comprising a substantially rectangular tubular member, said tubular member having an enlarged end with a shoulder which abuts an end of said carriage, wherein said bushing comprises four sides, each side having a rabbet which extends longitudinally from the shoulder to a longitudinal end of said bushing opposite said shoulder, and notches form in the opposite sides of said bushing in which can be accommodated a locking pin.

7. An exercise apparatus, comprising:

at least one exercise station having at least one rail;

a carriage carried on said rail, the carriage constructed for relative travel along said rail; and at least one polymer bushing snugly fitted between said carriage and said rail, said bushing having a smooth bearing surface which faces and rides on said rail, said bushing comprising a substantially rectangular tubular member, said tubular member having an enlarged end with a shoulder which abuts an end of said carriage, wherein said polymer bushing is made of polyhexamethylene adipamide.

* * * * *